(12) United States Patent
Pados et al.

(10) Patent No.: US 8,310,170 B2
(45) Date of Patent: Nov. 13, 2012

(54) CIRCUIT ARRANGEMENT FOR CONTROLLING LIGHT EMITTING DIODES

(75) Inventors: Martin Pados, Ettlingen (DE); Jan Ellmann, Karlsruhe (DE); Michael Gültig, Stutensee (DE)

(73) Assignee: INit Innovative Informatikanwendungen in Transport-, Verkehrg-und Leitsystemen GmbH, Karlsruhe (DE)

( * ) Notice: Subject to any disclaimer, the term of this patent is extended or adjusted under 35 U.S.C. 154(b) by 232 days.

(21) Appl. No.: 12/802,650

(22) Filed: Jun. 11, 2010

(65) Prior Publication Data

US 2010/0327770 A1     Dec. 30, 2010

(30) Foreign Application Priority Data

Jun. 24, 2009   (DE) .......................... 10 2009 030 174

(51) Int. Cl.
*H05B 41/16*     (2006.01)

(52) U.S. Cl. ..................... 315/247; 315/185 S; 315/291; 315/224; 315/312

(58) Field of Classification Search .................. 315/247, 315/224, 225, 291, 307–311, 185 S
See application file for complete search history.

(56) References Cited

U.S. PATENT DOCUMENTS 6,724,158 B1    4/2004   Feldman
2011/0285323 A1 *  11/2011   Kuo et al. ..................... 315/307

FOREIGN PATENT DOCUMENTS

WO   WO 2008/084439    7/2008

* cited by examiner

*Primary Examiner* — Tuyet Thi Vo
(74) *Attorney, Agent, or Firm* — Klaus J. Bach

(57) ABSTRACT

In a circuit arrangement for controlling light emitting diodes (LED's) combined in groups, with at least one driver which has current outputs, via which current can be delivered to the LED's, as well as a control input by which the current supplied to the LED's is adjustable, the current control input is connected to the voltage output of a voltage source.

3 Claims, 2 Drawing Sheets

CIRCUIT ARRANGEMENT FOR CONTROLLING LIGHT EMITTING DIODES

BACKGROUND OF THE INVENTION

The invention relates to a circuit arrangement according to the preamble of claim 1, for controlling light emitting diodes (LED), which are combined in groups including at least one driver which has outputs for supplying electric current to the LED's and a control input for adjusting the electric current supplied to the LED's.

Such a circuit arrangement is well-known in the state of the art and is used for example for controlling LED's of a billboard or indicator board. As a driver, by which for example a group of sixteen LED's is energized or, respectively, supplied with electric current, a multitude of different types is available. All have in common that the current supplied to the LED's is adjustable by means of a resistor which is connected to the control input.

When the light output of an LED group, that is, the light output of the LED's or the LED group controlled by the driver is to be changed, the resistance must be changed. To this end, the resistor may be in the form of a potentiometer.

Since the light output of the LED groups often needs to be adjusted to the ambient of the LED group, a corresponding adjustment of the resistor is necessary. This however is quite costly, if a multitude of LED groups is combined to an indicator board.

A big problem in the adjustment of the light output of a LED group (or respectively, the output current of the respective driver unit), for example, of an indicator board resides in the fact that one has to be within reach of the resistor or respectively the driver and, consequently, the LED group so that the light output change cannot be satisfactorily monitored. When, for example, the light output of a LED group is to be changed in order to adjust the light output of a new LED group to the light output of the adjacent. LED groups as it is necessary for example upon the replacement of a defective LED group by a new LED group, it is generally necessary that, after a change of the resistor setting the repair person moves away from the indicator board to be able to better judge the brightness of the new LED group in relation to the brightness of the adjacent LED groups. If the brightness is still not correct the repair person has to return to the indicator board to change the resistance value and again has to move away from the indicator board for judgment. This needs to be repeated until the brightness is correct. This procedure however is very unsatisfactory.

A further problem with the known control of LED's resides in the fact that the brightness of the LED's cannot be changed continually during operation. It is, for example, not possible so far, to adjust the brightness of the LED's during operation to the ambient light conditions without problems. The LED's of an indicator board have for example the same brightness in daylight with the sun shining as they have at night when the moon is shining.

It is the object of the present invention to provide a circuit arrangement for controlling light emitting diodes in such a way that the brightness of an LED group is more easily adjustable and that it can also be changed during normal operation in a simple way.

SUMMARY OF THE INVENTION

In a circuit arrangement for controlling of light emitting diodes (LED's) combined in groups, with at least one driver which has outputs, via which current can be delivered to the LED's as well as a control input by which the current supplied to the LED's is adjustable, the control input is connected to the output of q voltage source 3.

In accordance with the present invention, a circuit arrangement for the control of light emitting diodes (LED) which are combined in groups including at least one driver which has outputs for supplying current to the LED's and a control input for adjusting the current being supplied to the LED's, is characterized in that the control input is connected to the output of a voltage source.

As a result of the control input of the driver being connected to the output of a voltage source, the current supplied to the LED's and, consequently the brightness of the LED's supplied with current by the driver can be adjusted in a simple manner. It is particularly advantageous if the voltage source is controllable.

For the adjustment of the voltage of the voltage source, it is not necessary to be in the proximity of the voltage source since there is no need for manually adjusting a component in order to adjust the voltage of the voltage source. The voltage of a voltage source can be adjusted in a simple manner by changing electrical values such as the current or the voltage. It is therefore possible to control the voltage of the voltage source in such a way that it assumes a value dependent on the brightness of adjacent LED's. In particular, the voltage of a voltage source can be adjusted in a simple manner by remote control, wherein the remote control may be connected to the voltage source by wire or wirelessly. In this way, it is advantageously possible to directly visually monitor the effects of a change of the voltage applied by the voltage source to the control input of the drive with respect to the brightness of the LED's. This substantially facilitates the adjustment of the brightness of the LED's to the ambient.

It is particularly advantageous that the control input of the voltage source can be connected to an adjustable voltage divider whose input voltage is adjustable. In this way, it is possible to adjust the output voltage and, accordingly, the brightness of the LED's by means of the voltage divider first with a predetermined overall voltage applied to the voltage divider in such a way that the brightness of the LED's corresponds to a base value with which the indicating board is operated. The voltage divider is herein so adjusted that the base brightness corresponds to the base brightness of the adjacent LED's. As base brightness advantageously a value is taken at which the LED's are energized by about half of the maximum admissible current.

When the ambient light changes for example by sunlight the overall voltage applied to the voltage divider may be increased. As a result, also the voltage provided by the voltage divider and consequently the voltage supplied by the voltage source and the current flowing through the LED's as well as the brightness of the LED's are increased. If several boards are combined to an indicating table the brightness of all LED's can be changed by changing the overall voltage applied to the respective voltage dividers. By changing the total voltage furthermore the energy that is consumed by an indicating boards or table can be influenced in a simple manner. It is therefore possible to operate the indicating boards or table with an intelligent energy management.

Since it has been found that the control inputs of several drivers can be connected to a common voltage source as this is done in a particular embodiment, it is advantageously possible to combine several LED groups in a common board and to connect the control inputs of the drivers of the LED's arranged on the board to a common voltage source. In this way, the brightness of a multitude of LED's can be jointly adjusted in a simple manner.

Then, however, it is no longer possible to change the brightness of the LED's combined on a board relative to one another; but this presents generally no problem, since the LED's generally are manufactured all in a particular production run and therefore have all the same properties. That is, the brightness of the LED's combined in a board is essentially the same.

However, if, after passage of an extended period, a board needs to be replaced, the brightness of the LED's arranged on the replacement board is generally different from the brightness of the LED's on the remaining adjacent boards because of aging of the remaining LED's so that the brightness of the LED's on the replacement board needs to be adjusted. In order to have a high-quality indication, the base brightness of the LED groups should be adapted to one another. Since an indicating board may often have more than thousand LED groups, the expenditures for an adaptation of the base brightness of the LED groups is correspondingly high. By means of the circuit arrangement according to the invention, an adaptation of the brightness of a new board is easily possible, particularly for an indicating board with a plurality of LED's combined in groups. In this connection, it is particularly advantageous that the voltage source can be remotely controlled.

Further particulars, features and advantages of the present invention will become more readily apparent from the following description of a particular embodiment with reference to the accompanying drawings.

DESCRIPTION OF A PARTICULAR EMBODIMENT

Figure 1:
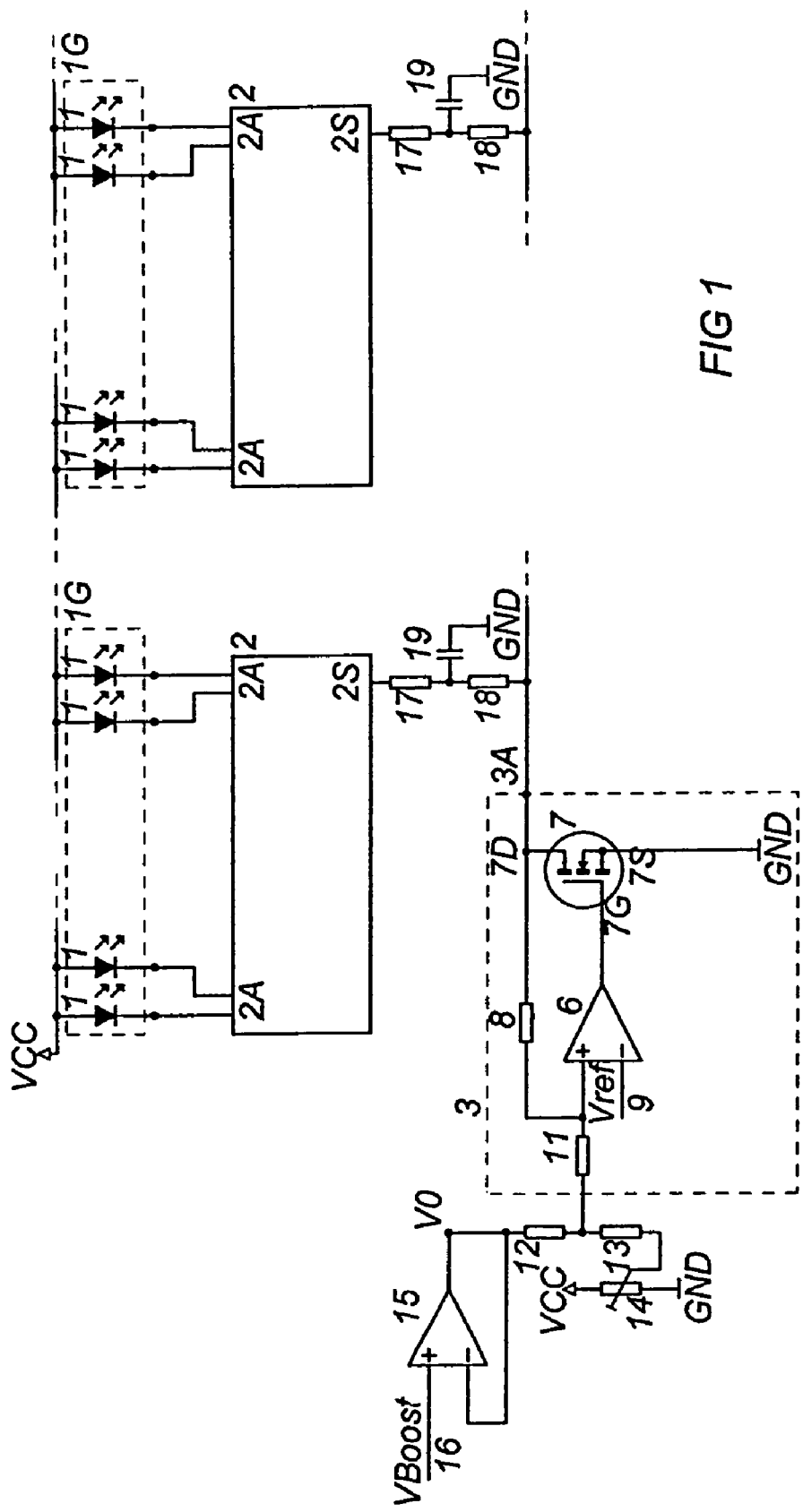
FIG. 1 an embodiment of the circuit arrangement according to the invention, and in FIG. 2 a schematic representation of an indicating board.

As shown in FIG. 1, in each case one group 1G of altogether sixteen LED's 1 is controlled by a driver 2 to the respective outputs 2A of which the LED's 1 are connected. The respective driver 2, which may be for example a low voltage 16 Bit Constant Current LED Sink Driver SDP16CP596 of the company ST further includes a control input 2S, which is connected to the output 3A of a voltage source 3. Altogether, for example, sixty LED groups 1G may be combined in a board and controlled by a common voltage source 3. For the suppression and for a basic adjustment of the current supplied by the driver 2 to the LED's 1, the control input 2S of the driver 2 is connected to the output 3A of the voltage source 3 via an RC-network 17, 18, 19.

The voltage source 3 is of conventional design and includes a first operational amplifier 6 whose output is connected to the gate connection 7G of a field effect transistor 7 and, consequently, controls the field effect transistor 7. The drain connection 7D of the field effect transistor 7 which at the same time forms the output 3A of the current source 3, is connected, via a resistor 8, to the plus input of the first operational amplifier 6. The source connection 7S of the field effect transistor 7 is connected to mass. At the negative input of the first operational amplifier 6, a self-generated reference voltage $V_{Ref}$ is connected. The constant reference voltage $V_{Ref}$ and the values of the building components (for example, resistance values) used in this circuit part were so selected that, with a certain analog value of the input voltage $V_{Boost}$, the desired associated analogous voltage is obtained at the setting input 2S of the driver 2. The first operational amplifier 6 operates in this connection in combination with the field effect transistor 7 as an inverting amplifier.

The positive input of the first operational amplifier 6 is connected via a resistor 11 to a voltage divider which comprises two resistors 12, 13 and a potentiometer 14. The voltage divider is fed by a second operational amplifier 15, whose plus input forms a boost input 16 of the voltage source 3. The negative input of the second operational amplifier 15 is connected to the output of the second operational amplifier 15.

Depending on the voltage $V_{boost}$ at the boost input 16 the voltage applied by the voltage source 3 to the inputs 25 of the driver can be adjusted. A basic voltage applied to the voltage source 3 at a first predetermined voltage $V_{Boost}$ to the boost input 16 to the control inputs 25 of the driver 2 can be set by means of the potentiometer 14. That means that, by means of the potentiometer 14, the brightness present at the first predetermined voltage $V_{boost}$ of the LED's which are controlled by the respective drivers 2 can be adapted to the brightness of adjacent LED's whose drivers are controlled by another voltage source.

The first predetermined voltage $V_{Boost}$ is so selected that the LED's are operated by a current which corresponds about to half the maximally admissible current. If the brightness of the LED's 1 is to be increased because for example the brightness of the ambient light has been increased the voltage $V_{boost}$ is increased correspondingly. In this way, the total voltage $V_o$ present at the voltage divider is increased whereby the voltage applied by the voltage source 3 to the driver 2 is increased so that the drivers 2 connected to the output 3A of the voltage source 3 all increase the current flow through the controlled LED's, which results in a uniform brightness change of the respective LED's.

Figure 2:
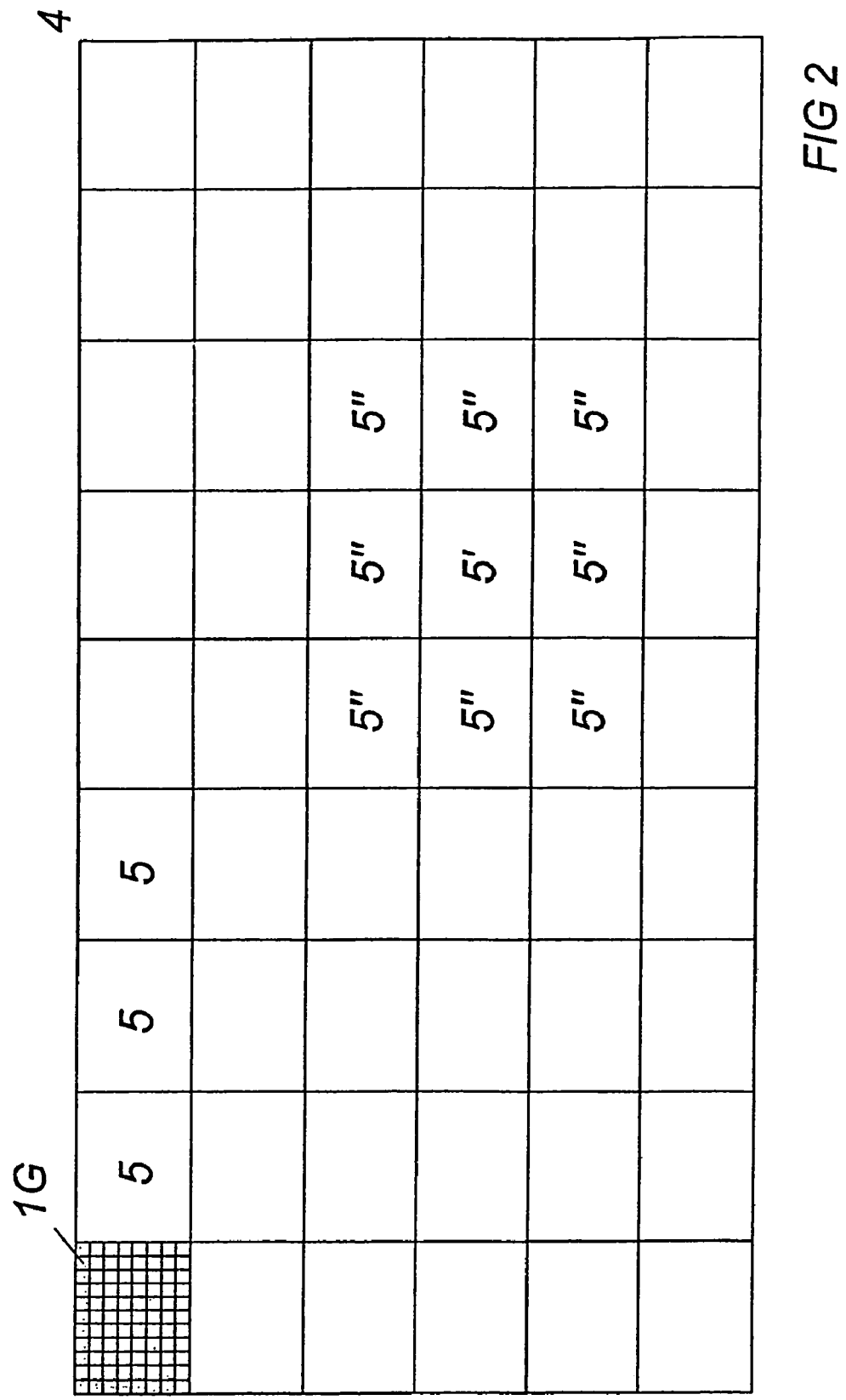

As apparent from FIG. 2, the indicator board 4 consists of a plurality of boards 5, of which each comprises a plurality of groups of sixteen LED's. An indication table may for example include six to sixty boards wherein a single board includes sixty groups having each sixteen LED's.

If, for example, the board 5' shown in FIG. 2 is to be replaced by a new board, the brightness of the LED's disposed on the board 5' is adapted by means of the potentiometer 14 at the same predetermined voltage $V_{boost}$ to the brightness of the adjacent board 5".

What is claimed is:

1. A circuit arrangement for controlling light emitting diodes (LED) (1) combined in groups (1G), said circuit arrangement comprising a voltage source (3), at least one driver (2) which includes outputs (2A) via which current can be supplied to the LED's (1), and a current control input (2S) by means of which the current deliverable to the LED (1) is adjustable, the current control input (2S) being connected to an output (3A) of the voltage source (3), the voltage source (3) including a voltage control input by means of which the output voltage of the voltage source 3 is controllable and the voltage control input of the voltage source (3) being connected to an adjustable voltage divider (12, 13, 14) whose total voltage ($V_o$) is adjustable.

2. The circuit arrangement according to claim 1, wherein the current control inputs (2S) of several drivers (2) are connected to a common voltage source (3).

3. An LED indicating board (4) comprising a plurality of groups (1G) of combined LED's (1), and a circuit arrangement for controlling the groups (1G) of light emitting diodes (LED) (1), said circuit arrangement comprising a voltage source (3), at least one driver (2) which includes outputs (2A) via which current can be supplied to the LED's (1), and a current control input (2S) by means of which the current deliverable to the LED's (1) is adjustable, the current control input (2S) being connected to an output (3A) of the voltage source (3), and the voltage source (3) including a voltage control input by means of which the output voltage of the voltage source (3) is controllable and the voltage control input of the voltage source (3) being connected to an adjustable voltage divider (12, 13, 14) whose total voltage (($V_o$) is adjustable.

* * * * *